United States Patent Office 3,340,313
Patented Sept. 5, 1967

3,340,313
SYNTHESIS OF ALCOHOL BY HYDRATION OF OLEFIN
Akio Mitsutani, Kurashiki, Japan, assignor to Kurashiki Rayon Company Limited, Kurashiki, Japan, a corporation of Japan
No Drawing. Filed Feb. 20, 1964, Ser. No. 346,097
Claims priority, application Japan, Mar. 23, 1963, 38/15,115
2 Claims. (Cl. 260—641)

The present invention relates to a method of synthesizing alcohol by the hydration of an olefin having more than 2 and less than 10 carbon atoms with water in the vapor phase using as catalyst a product, which is prepared from a solid phosphoric acid catalyst comprising phosphoric acid deposited on a carrier mainly consisting of silica, by heat treatment at a temperature of from 700° C. to 1,100° C. or by heating to a temperature below 1,100° C. and subsequently extracting the water soluble substances with water.

The direct hydration of olefins is a very important industrial reaction for the synthesis of ethanol and isopropanol directly from ethylene and propylene, this is the so-called method of manufacturing synthetic alcohols by petrochemistry. As the catalyst for direct hydration of olefins in the vapor phase a catalyst of tungsten oxide or solid phosphoric acid has heretofore been most popular in the commercial field. Among them has been a solid phosphoric acid catalyst, consisting of a carrier mainly containing silica, for instance diatomaceous earth, dipped in ortho-phosphoric acid, then dried at 100° C. to 150° C. and heat treated at 220° C. to 250° C. before use. In this case, the phosphoric acid on the carrier takes the form of ortho- and pyro-phosphoric acids. The quantities of metaphosphoric acid and of the reaction products of phosphoric acid with silica increases as the catalyst is calcined at higher temperatures and the activity is lowered so that the high temperature treatment is considered to be not desirable. Accordingly it has been thought to be very undesirable to heat treat the solid phosphoric acid catalyst at a temperature above 350° C. Moreover, it has been considered as contrary to common sense to heat-treat it at such a high temperature as above 700° C. to completely deactivate it. Thus use of the product in a reaction after heat-treating the solid phosphoric acid catalyst at a high temperature such as 700° C. to 1,100° C. has never been heretofore carried out for the above described reasons, and also it has been considered that if a solid phosphoric acid catalyst is treated at a temperature lower than 1,100° C. and then water soluble substances are extracted by water, the product loses activity completely due to the fact that the active phosphoric acid is removed.

The inventor has found that a product, which is prepared from a solid phosphoric acid catalyst comprising phosphoric acid deposited on a carrier mainly containing silica, by heating at a temperature of from 700° C. to 1,100° C., or by heat treating at a temperature below 1,100° C. and then extracting the water soluble substances with water conspicuously loses activity for the polymerization of hydrocarbon, catalytic cracking and skeletal isomerization and has substantially no activity for these reactions, but it has still sufficient activity for the synthesis of alcohol by the hydration of olefin and enables the synthesis of alcohol from olefin at very excellent selectivity with very small side reaction owing to the fact that it has no activity for the polymerization, catalytic cracking and skeletal isomerization.

The life of the catalyst is considerably elongated since there is no carbonization and polymerization of the raw materials on the surface of catalyst. This fact has very large effects commercially and contributes to simplification of the operation and reduction of the cost of alcohols. The heretofore used solid phosphoric acid catalysts have been heat treated at a temperature below 600° C., more particularly below 300° C. and have short operating life as catalysts and low yield due to the fact that there is considerable carbonization, polymerization and other side reactions on the surface of the catalyst during the hydration of olefins. In order to obviate such disadvantages attempts have been made to lower the reaction rate with a high space velocity in the operation or to increase the molar ratio of water to olefin in the reaction. This results in disadvantages owing to a low content of alcohol in the product, a large amount of steam used and a high cost for the heat necessary for the distillation separation.

The method of the invention enables selection of a low ratio of steam to olefin so that the alcohol content in the liquid product is high and the cost of the necessary heat quantity can be remarkably reduced and moreover the life of catalyst is elongated and the generation of by-products is considerably lowered. All such merits bring about very useful advantages cumulatively. Moreover it is further advantageous that corrosion of the apparatus need not be taken into consideration since the catalyst does not contain water soluble free phosphoric acid.

The olefins to be used for the purpose of the invention are those having 2 to 10 carbon atoms and the invention is most suitable for synthesizing ethanol from ethylene, propanol from propylene, and butanol from butylene by directly reacting olefin with steam in the vapor phase.

As the carrier mainly containing silica on which phosphoric acid is deposited use is made usually of diatomaceous earth, but silica gel and silica sand can also be used. The temperature for heat treating the solid phosphoric acid catalyst consisting of phosphoric acid deposited on a carrier mainly consisting of silica is preferably 700° C. to 1,100° C., whilst at above 1,100° C. it becomes glassy, completely losing activity. The time for the heat treatment should be longer than 2 hours and more preferably be more than 5 hours. The heat treatment may be effected in any atmosphere of air, nitrogen, vacuum and other inert gas. The same effect can be recognized when the solid phosphoric acid catalyst heat treated at a temperature lower than 1,100° C., more preferably higher than 500° C., is subjected to extraction with water to remove all water soluble substances from the catalyst.

The hydration may be carried out in the presence of a small quantity of dilute gas which is inactive to the hydration in addition to olefin and steam. The reaction temperature for effecting the hydration is within the range of 150° C. to 500° C., but the optimum range is 200° C. to 350° C. The reaction may preferably be carried out under pressure in order to increase the concentration of alcohol in the liquid product, and the extent of pressure is preferably higher provided that the olefin and steam remain in the gaseous state at the reaction temperature. The catalyst bed in the hydration may be of any type of fixed, moving or fluidized catalyst bed.

The gases discharged from the reactor are cooled in a condenser to separate the condensed part and the unreacted olefin can be reused directly in the cycle by supplementing the consumed part.

The liquid product is distilled to separate and purify alcohol.

The invention will now be explained more in detail with examples.

Example 1

The catalyst was prepared by heat treating granular solid phosphoric acid catalyst, manufactured by a conventional process from ortho-phosphoric acid and diatomaceous earth, at a temperature of 1,000° C. for 16 hours in the presence of air. 100 cc. of said catalyst was filled in a pressure resisting reactor made of stainless steel having a capacity of 300 cc. N l./hrs. of ethylene compressed to 60 atmospheric pressures and preheated to 300° C. and 40 g./lit. of steam of 60 atmospheric pressures at 300° C. was blown into the reactor effect the contact reaction at 300° C. The gases coming out of the reactor were passed through a water cooled condenser to collect the condensed portion, then the remainder was discharged after the flowing quantity of unreacted ethylene was measured. The condensate was analyzed by means of gas chromatography with polyethylene glycol 1,000 column. After reaction for 4 hours the conversion of ethylene was 4.5% and the yield of ethanol based on the reacted ethylene was 98.5%.

On the other hand, for the sake of contrast the granular solid phosphoric acid catalyst manufactured by the same process was heat treated at 400° C. for 16 hours and using the catalyst the reaction was effected for 4 hours under the same condition, then the conversion of ethylene being 4.8% and the yield of ethanol based on the reacted ethylene being 89.7.

It will be apparent from the above results that the invention has useful effects.

Example 2

30 g. of the catalyst heat treated at 600° C. for 16 hours in the same manner as Example 1 was further extracted with water at 60° C. for 8 hours in a Soxhlet extractor to perfectly extract water soluble substances, then the product was charged into silica tubes of a tubular electric furnace and reacted by maintaining the temperature at 300° C. and injecting 10.0 lit./hr. of propylene and 5.0 cc./hr. of water under the atmospheric pressures to effect contact reaction. The gases coming out of the reactor was cooled by a water cooled condenser to separate the condensate, and the unreacted ethylene was discharged after measuring its quantity. The condensate was analyzed in the same manner as in Example 1.

The result after reaction of 2 hours showed that the conversion of propylene was 0.04%, whilst the yield of isopropanol was 99.6% based on the reacted propylene.

On the other hand, when the catalyst heat treated at 600° C. for 16 hours but not extracted with water was used to react under the same condition, the conversion of propylene was 0.024% and the yield of isopropanol was 80.3% based on the reacted propylene. When the catalyst of the invention was used there occurred no peak other than isopropanol and water in the product by gas chromatography, but when the catalyst which was heat treated at 600° C. only was used there appeared many unknown peaks beside the above.

What I claim is:

1. A method of synthesizing alcohol by the hydration of an olefin having from 2 to 10 carbon atoms which comprises contacting the olefin and water in the vapor phase at a temperature of from 150° C. to 500° C. with a catalyst free of water soluble components which is prepared by a process consisting of heat treating a solid phosphoric acid catalyst consisting of phosphoric acid deposited on a carrier consisting essentially of silica, the heat treatment being carried out at a temperature in the range of from 700° C. to 1100° C. for more than two hours.

2. A method of synthesizing alcohol by the hydration of an olefin having from 2 to 10 carbon atoms which comprises contacting the olefin and water in the vapor phase at a temperature of from 150° C. to 500° C. with a catalyst free of water soluble components which is prepared by a process consisting of (1) heat treating a solid phosphoric acid catalyst consisting of phosphoric acid deposited on a carrier consisting essentially of silica, the heat treatment being carried out at a temperature of from 500° C. to 1100° C. for more than 2 hours and (2) washing the heat treated catalyst with water to remove water soluble components from said heat treated catalyst.

References Cited

UNITED STATES PATENTS

| | | | |
|---|---|---|---|
| 2,507,625 | 5/1950 | Ehrhardt | 252—437 |
| 2,876,266 | 3/1959 | Wegner | 260—641 |
| 3,232,997 | 2/1966 | Ester | 260—641 |

FOREIGN PATENTS 547,633  10/1957  Canada.

LEON ZITVER, *Primary Examiner.*

J. E. EVANS, *Assistant Examiner.*